Feb. 27, 1940.     J. DE STERNBERG     2,191,789
MACHINE FOR THE MOLDING OR CASTING UNDER PRESSURE OF METALS
Filed Feb. 10, 1938     3 Sheets-Sheet 1

INVENTOR:
JAIME DE STERNBERG
BY Haseltine, Lake & Co.
ATTORNEYS

Feb. 27, 1940.   J. DE STERNBERG   2,191,789
MACHINE FOR THE MOLDING OR CASTING UNDER PRESSURE OF METALS
Filed Feb. 10, 1938    3 Sheets-Sheet 2

INVENTOR:
JAIME DE STERNBERG
BY Haseltine Lake & Co.
ATTORNEYS

Feb. 27, 1940.   J. DE STERNBERG   2,191,789
MACHINE FOR THE MOLDING OR CASTING UNDER PRESSURE OF METALS
Filed Feb. 10, 1938   3 Sheets-Sheet 3
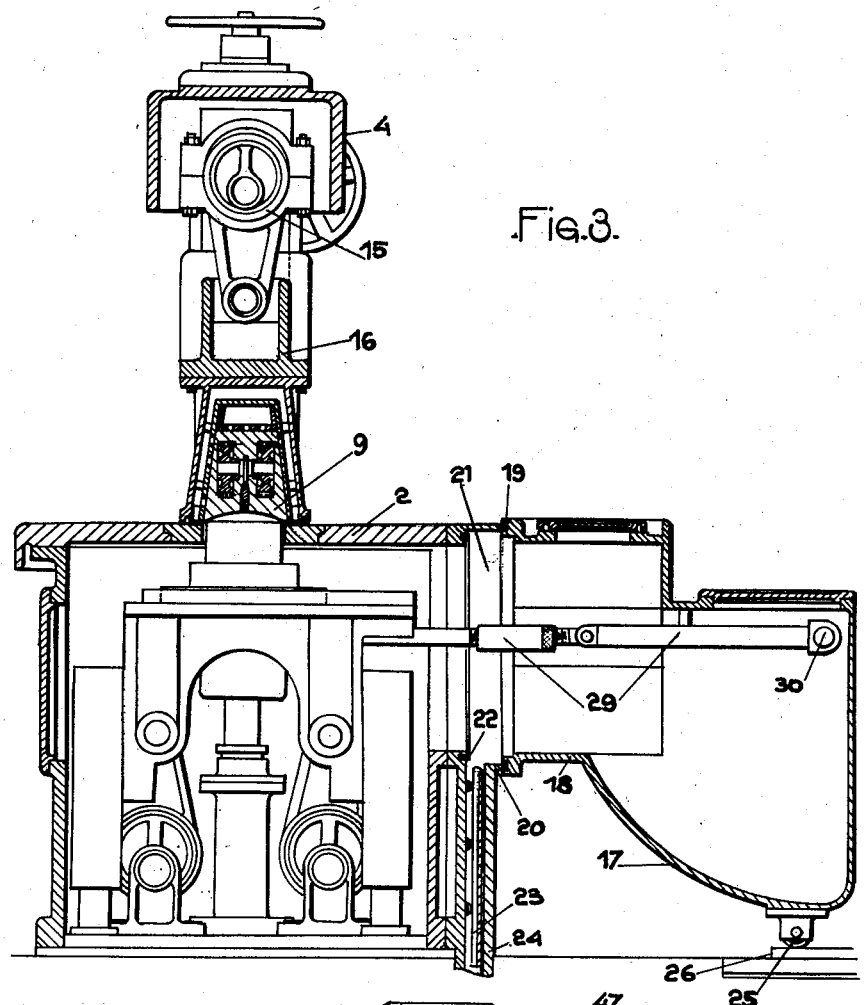
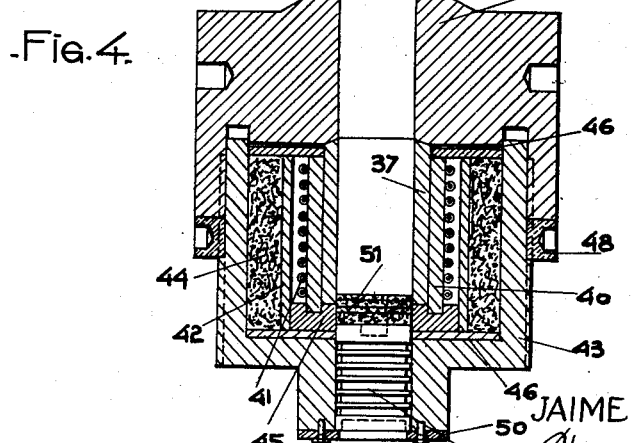
INVENTOR:
JAIME DE STERNBERG
BY Haseltine, Lake & Co.
ATTORNEYS Patented Feb. 27, 1940

2,191,789

UNITED STATES PATENT OFFICE 2,191,789

MACHINE FOR THE MOLDING OR CASTING UNDER PRESSURE OF METALS

Jaime de Sternberg, Montigny-les-Cormeilles, France

Application February 10, 1938, Serial No. 189,725
In France February 17, 1937

4 Claims. (Cl. 22—68)

The present invention has for object a machine for the casting or molding under pressure of various metals and particularly of ferrous metals.

This machine allows of obtaining by casting, at a quick cadence, members of a series which require little or no subsequent machining. This casting can be effected at a constant temperature and consequently with the desired degree of fluidity of the metal.

The machine is mainly characterised by the following points applied separately, or in any combinations:

(a) The metal is injected in the mold from a pressure chamber in which moves at least one delivery piston.

(b) The pressure chamber is reheated electrically.

(c) The mold is applied in a fluid-tight manner on an orifice communicating with a vacuum chamber in which is introduced the pressure chamber previously loaded with metal to be injected in the mold.

(d) The pressure chamber is supported by a movable unit externally to the vacuum chamber and which:

Allows of loading the pressure chamber in the free air,

Constitutes a cradle for introducing the loaded pressure chamber in the vacuum chamber.

(e) The vacuum chamber contains, on the one hand, an elevating support which allows of bringing the pressure chamber in contact with the inlet to the mold and, on the other hand, means for actuating the piston for delivering the metal.

The invention also includes in its scope, by way of new industrial products, molds for casting or molding under pressure, made of refractory material and particularly of molten cement and of asbestos powder.

The accompanying drawings illustrate, by way of example only, a form of construction of a machine to which are simultaneously applied the above defined characteristic features.

Fig. 3 is an elevation, with vertical section, showing the machine at the end of a molding operation.

Figs. 4 and 5 are axial sections of a pressure chamber with electric reheating, and of a pressure chamber without reheating, respectively.

Figure 1:
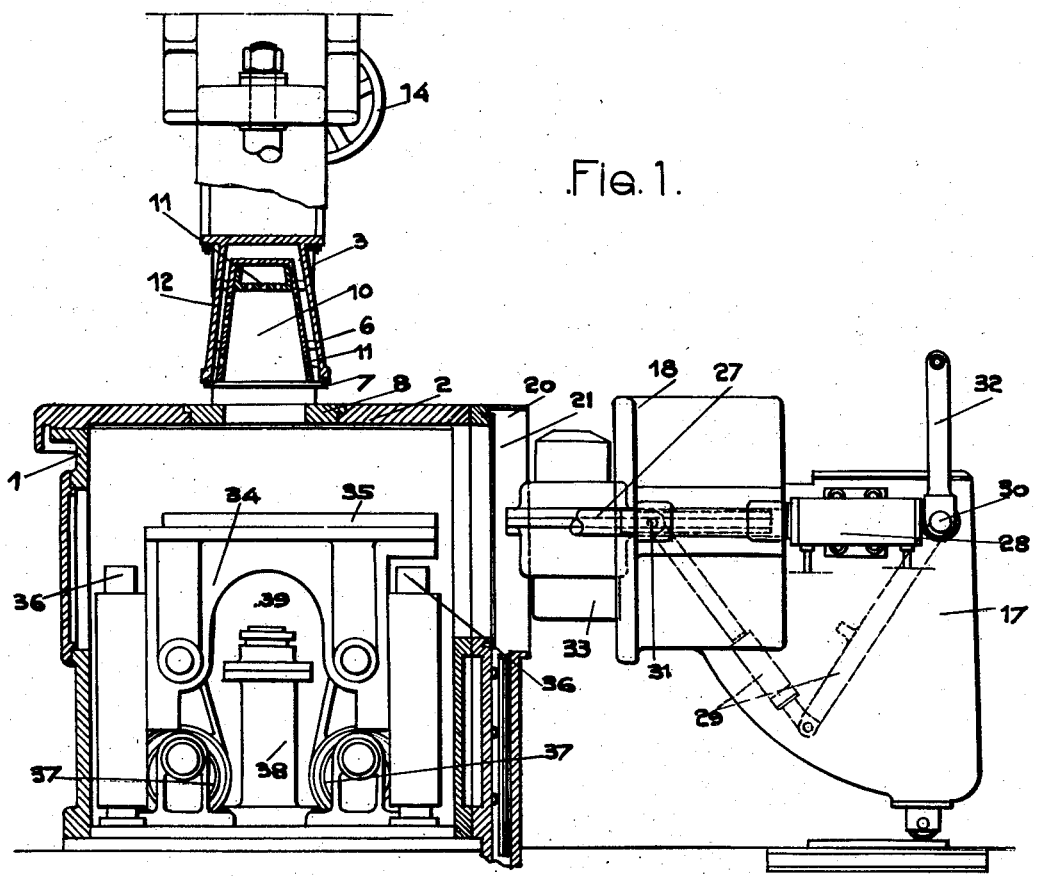
Fig. 1 is a general elevation of the machine with parts broken away and vertical sections, the pressure chamber being in loading position.

The machine comprises a frame or base 1 which constitutes the vacuum chamber the upper wall 2 of which forms a molding table. This frame supports two columns 3 on which is mounted an upper cross-piece 4 which can advantageously be journalled at its ends for oscillating about a theoretical axis parallel to the upper surface of the table 2.

The cross-piece 4 supports, suitably guided and vertically adjustable by means of a hand wheel 5, a unit which constitutes a mold-carrier 6 the lower edge of which provided with a suitable ring 7 can bear, in a fluid-tight manner, on a crown 8 of the table 2. The mold-carrier 6 has double walls. The inner wall of frustum shape receives the elements of the mold 9, made of metal or the like and the space 10 receving this mold is in communication through orifices 11 with the space 12 which, itself open at its lower part is, owing to the presence of the fluid-tight ring 7, in communication with the vacuum chamber 1 through the central hole of the crown 8.

The mold can be a metallic mold, but preferably, it is constituted by an agglomerate of molten cement and of asbestos powder in the proportion of one part by weight of cement for five parts of asbestos powder.

For introducing a mold in the mold-carrier, or for removing it from the latter, the hand wheel 5 is acted upon for lifting the mold-carrier as shown in Fig. 1, and the rocking unit leaves the vertical by pivoting about journals previously mentioned. When the mold is introduced in the mold-carrier 6, the latter is lowered for bringing the ring 7 in contact with the crown 8 and, by acting on the hand wheel 14, the mold-carrier is locked on the table 2, through the medium of an eccentric 15. This locking is ensured by a slide-block 16 which absorbs the reaction of the mold-carrier 6 when the metal is injected in the mold. The effect of the vacuum in the chamber 1 moreover participates in the locking action.

Outside the chamber 1 is provided a frame 17 which comprises a chamber 18 open at its front part and provided with a fluid-tight joint 19 through which it can press against the edge 20 of an opening 21 giving access to the vacuum chamber 1. In front of the edge 20 is also provided a bearing or fluid-tight joint 22 for a shutter 23 or sliding obturator which, when it is withdrawn, is arranged in a fluid-tight well 24. The obturator 23 is actuated by any suitable means not shown. The frame 17 rests through the medium of rollers 25 on horizontal rails 26 so that it can be moved towards or from the vacuum chamber 1. The displacements of the frame 17 are ensured in any suitable manner and, for instance, and as partially illustrated, by means of two devices each comprising a piston which is connected to bars 27 secured to the base 1 of the machine and arranged in a cylinder 28 carried by the frame 17.

By admitting a fluid under pressure on one or the other of the faces of the pistons, the frame 17 is moved towards or from the chamber 1.

The pressure chamber is supported relatively to the frame 17 so that it can be moved horizontally in translation. All appropriate means can be utilised for that purpose. In the drawings has been shown, for controlling the displacements in translation, a system of jointed levers 29 having a fixed pivotal point 30 and a pivotal joint horizontally guided. The pivot pin at the fixed point 30 is engaged by an operating lever 32 which allows, either of connecting the system 29 for moving the pressure chamber 33 to its rear position (Fig. 2), or to extend it for moving the chamber 33 to its extreme front position (Fig. 3), or again for placing said chamber 33 in an intermediate position (Fig. 1). The lever 32 can be actuated by hand or automatically by being kinematically connected with the other movements of the machine if the latter is to operate entirely automatically.

Within the vacuum chamber 1 is arranged a support 34 which is provided, at its upper part, with two slide-ways 35 adapted to receive the pressure chamber 33. This support, vertically guided along columns 36 can be raised or lowered by any suitable control mechanism actuated, for instance, pneumatically or hydraulically from a piston provided with a rack 52, and a toothed segment 53 and combined with eccentrics 37 or distinct from the latter which then only serve for ensuring the locking of the support in its extreme upper position.

A cylinder 38 is arranged in the axis of the mold-carrier and comprises a piston 39 which can be vertically moved under the thrust of a fluid under pressure admitted in the cylinder.

The pressure chamber 33, adapted to receive the batch of molten metal to be injected in the mold, can be provided or not with means for reheating the metal. In the embodiment of Fig. 4, the chamber comprises a cylinder 37 made of refractory material reinforced by a casing made of graphite 40 around which are arranged electric heating resistances 41 externally protected by a refractory casing 42. The whole is contained in a metal cylinder 43 with a filling or lining of asbestos wool 44. A refractory ring is also provided at 45 as well as washers 46 and the whole is held in place by a head or upper steel member 47 which fits over the cylinder 43 and comprises a ring 48 the lower face of which rests either on supports provided in the chamber 18, or on the side-ways 35.

A piston 49 is movable in the central perforation of member 43, this perforation forming the exact extension of the inner bore of the cylinder 37 (Fig. 4) and of the central perforation of member 47. In its lower position, the piston 49 is retained by an abutment washer 50 secured by screws or otherwise, on member 43. A refractory lining 51 constituted for instance, by a mixture of asbestos and graphite, is placed on the upper face of the piston 49 for avoiding the direct contact of the latter with the molten metal.

Figure 5:
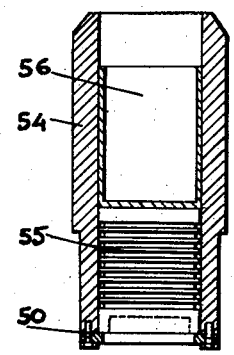

The pressure chamber thus obtained allows of maintaining the metal to be introduced in the mold at the temperature the most suitable for casting. The simple embodiment of Fig. 5 does not include reheating of the metal. The pressure chamber is constituted, in this case, by a steel cylinder 54 having a movable piston 55 supporting a refractory pot 56 which receives the batch of molten metal. As in the preceding embodiment, the piston is held in its lower position by a washer 50.

The operation of the machine is the following:

In Fig. 1, the mold-carrier 6 is lifted above the table 2 and can be inclined as already explained for receiving the mold 9. The frame 17, with the chamber 18, is moved away from the chamber 1 and acts on the lever 32 for bringing the pressure chamber 33 to the position it occupies in the drawings and in which it can receive the batch of molten metal. The pressure chamber 33 is then returned within the chamber 18.

Figure 2:
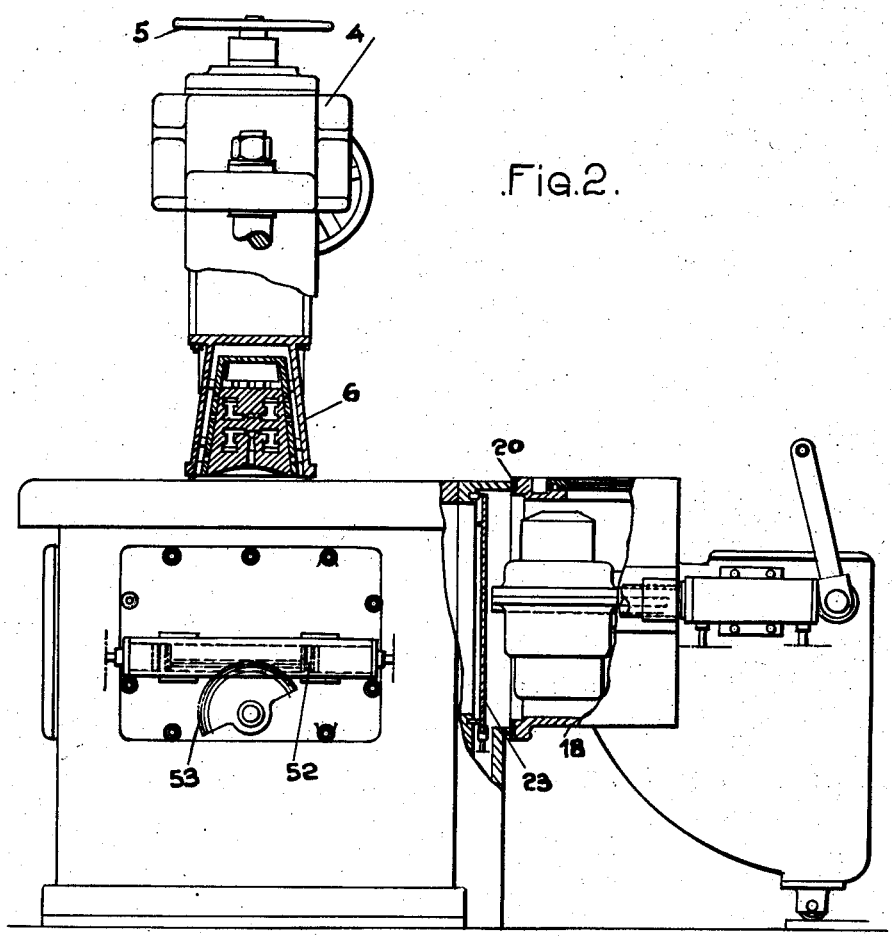
Fig. 2 is an elevation, with vertical sections and parts broken away, showing the pressure chamber loaded with metal, ready to be introduced in the vacuum chamber.

The mold 9 being placed in the mold-carrier 6, the latter is lowered into contact with the table 2, the obturator 23 is closed and vacuum is created in the chamber 1 (Fig. 2). Chamber 18 is then moved into contact with the edges 20 of the opening 21 of chamber 1 and the obturator 23 is opened. The vacuum then acts for applying the joint 19 on the edges 21. The mold-carrier 6 is locked on the table 2 by means of the slide-block 16 and the eccentric 15.

By means of the lever 32, the jointed system 29 controlling the pressure chamber 33 is completely extended for bringing the latter on to the slide-ways 35 of the support 34, exactly in the axis of the mold-carrier 6.

The support 34 is lifted for exactly applying the upper face of the pressure chamber 33 against the lower face of corresponding shape, of the mold 9 (Fig. 3). The piston 39 is then actuated and lifts the piston 49 or 55 of the pressure chamber 33 by pushing the molten metal into the cavities of the mold.

The previously mentioned operations are then repeated in reverse order; the full mold is replaced by an empty mold and another casting is effected. The cadence of the operations is rapid and the operation of the machine can be entirely automatic.

What I claim as my invention and desire to secure by Letters Patent is:

1. In a machine for the casting under pressure of high melting point metals, in combination, an air-tight chamber having an upper wall provided with an aperture, means for creating a vacuum into the said chamber, a crucible in two parts: a lower part adapted to receive a charge of melted metal metal means for electrically heating the said lower part, an upper part adapted to resist to the injection pressure, a movable piston constituting the bottom of the crucible, a vertically movable support in the chamber for supporting the crucible and bringing the same into the aperture of the upper wall of the chamber, a press to act upon the piston in order to transfer the whole charge of metal into the upper part of the crucible, a bell for containing a mold, and means for applying the said bell and mold upon the aperture of the upper wall of the chamber.

2. In a machine for the casting under pressure of high melting point metals, in combination: an air tight chamber having an upper wall provided with an aperture, means for creating a vacuum into the said chamber, a crucible in two parts: a lower part adapted to receive a charge of melted metal, means for electrically heating the said lower part, an upper part adapted to resist to the injection pressure, a movable piston constituting the bottom of the crucible, a second chamber adapted to be moved relatively to the first one, means in the second chamber to support the crucible, a vertically movable support in the first chamber for supporting the crucible and bringing the same into the aperture of the upper wall of the said first chamber, a press to act upon the piston in order to transfer the whole charge of metal into the upper part of the crucible, a bell for containing a mold, and means for applying the said bell and mold upon the aperture of the upper wall of the chamber.

3. In a machine for the casting under pressure of high melting point metals, of the kind of which melted metal contained in a cylindrical crucible is injected into a mold by moving a piston which constitutes the bottom of the crucible, a crucible in two parts: a lower part comprising an inner sheath of refractory material, a lining of graphite surrounding the said sheath, electric resistances for heating the sheath, a metal casing for containing the whole, and an upper part or metal head threaded upon the said casing and adapted to resist to the injection pressure and into which the melted metal is wholly transferred by the piston.

4. In a machine for the casting under pressure of high melting point metals, in combination, an air-tight chamber having an upper wall provided with an aperture, means for creating a vacuum in said chamber, an independent crucible, a movable door in a lateral wall of the air tight chamber for bringing said crucible into and out of said chamber, a movable piston constituting the bottom of the crucible, a vertically movable support in the chamber for supporting the crucible and bringing the same into the aperture of the upper wall of the chamber, a press to act upon the piston in order to transfer the whole charge of the metal into the upper part of the crucible, and means for applying a mold upon the aperture of the upper wall of the chamber.

JAIME DE STERNBERG.